US007040626B2

(12) United States Patent
Seelig et al.

(10) Patent No.: US 7,040,626 B2
(45) Date of Patent: May 9, 2006

(54) GAMING DEVICE BASE AND METHOD OF USE

(75) Inventors: Jerald C. Seelig, Absecon, NJ (US); Mac Seelig, Absecon, NJ (US); Jack McNamara, Mount Laurel, NJ (US); Michael Kobryn, Philadelphia, PA (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 0 days.

(21) Appl. No.: 10/944,341

(22) Filed: Sep. 15, 2004

(65) Prior Publication Data

US 2005/0087927 A1 Apr. 28, 2005

Related U.S. Application Data

(63) Continuation-in-part of application No. 10/245,628, filed on Sep. 16, 2002, now Pat. No. 6,880,825.

(60) Provisional application No. 60/503,307, filed on Sep. 15, 2003.

(51) Int. Cl.
*A63F 13/08* (2006.01)
*G07F 17/34* (2006.01)

(52) U.S. Cl. .............. 273/309; 273/148 R; 273/143 R; 463/46

(58) Field of Classification Search ............ 273/143 R, 273/309, 138.1, 138.2, 148 R; 463/46, 20
See application file for complete search history.

(56) References Cited

U.S. PATENT DOCUMENTS 4,678,234 A 7/1987 Wilson
4,991,908 A 2/1991 Krechel
5,044,483 A * 9/1991 Stefan ........................ 194/350
5,419,618 A 5/1995 Hatcher
D367,968 S 3/1996 Hatcher
5,577,806 A 11/1996 Ugalde
5,584,535 A 12/1996 Jacobson et al.
5,826,882 A * 10/1998 Ward .......................... 273/309

FOREIGN PATENT DOCUMENTS

JP 06178863 A * 6/1994
JP 11128490 A * 5/1999

OTHER PUBLICATIONS

InterGaming, Jan. 2001, p. 21, InterGame Ltd, Oldham, England (Full color).
InterGaming, Mar. 2001, InterGame Ltd, Oldham, England (Full color).
InterGaming, Apr. 2001, InterGame Ltd, Oldham, England (Full color).
InterGaming, Jul. 2001, InterGame Ltd, Oldham, England (Full color).
InterGaming, Aug. 2001, InterGame Ltd, Oldham, England (Full color).
InterGaming, Oct. 2001, InterGame Ltd, Oldham, England (Full color).

* cited by examiner

*Primary Examiner*—Benjamin Layno
(74) *Attorney, Agent, or Firm*—Ian F. Burns; Ian F. Burns & Associates

(57) ABSTRACT

A gaming device base having a storage area configured to store at least one non-currency gaming item is disclosed. The gaming device base further includes a horizontal support member having a substantially flat surface to support at least one gaming device. The gaming device base further has at least one door positioned beneath the horizontal support member and also may have at least one edge. The door includes the storage area configured to store the non-currency gaming item and further may be moved from an open to a closed position; the door may also include an angled portion. In the open position, the storage area may be accessed and, in the closed position, the door is positioned behind the edge of the horizontal support member. Players sitting in front of the edge of the horizontal support member may stretch or extend their legs behind the edge of the horizontal support member.

12 Claims, 7 Drawing Sheets

GAMING DEVICE BASE AND METHOD OF USE

CROSS REFERENCE TO RELATED APPLICATIONS

This application is a continuation-in-part of U.S. patent application Ser. No. 10/245,628, filed Sep. 16, 2002 now U.S. Pat. No. 6,880,825. This application also claims priority to U.S. provisional patent application No. 60/503,307 filed on Sep. 15, 2003; the latter is hereby expressly incorporated by reference in its entirety.

BACKGROUND OF THE INVENTION

1. Field of Invention

The present invention relates to gaming device bases used to support gaming devices in casinos and other operating locations, and a method of use. More particularly, the present invention relates to a gaming device base including a storage area configured to store non-currency gaming items and a method for storing therein.

2. Background

Gaming device bases or stands are well known in the art and they are widely used to support gaming devices in casinos and other gaming establishments. Gaming device bases generally support one or more gaming devices above a floor where the gaming device may be more easily seen, played, and serviced.

Gaming device bases may be configured to accommodate varying numbers of gaming devices. For example, gaming device bases may be configured to support one, two, four or more of gaming devices. Gaming device bases may further be positioned in a variety of configurations. For example, gaming device bases may be configured to accommodate gaming devices positioned back-to-back or side-by-side.

An example of a gaming device base is disclosed in Jarrett (U.S. Pat. No. Des. 354,637). One of the problems associated with gaming device bases, such as the one disclosed in Jarrett, is that they commonly have flat front surfaces that prevent players from extending their legs. It has been found that many players are more comfortable if they can extend their legs in front of them, even a small amount, rather than keeping their legs tightly bent. When players are more comfortable, they tend to have a more enjoyable experience and tend to play longer.

Another problem with gaming device bases, such as the one disclosed in Jarrett, is that the top surface does not have sufficient strength to support the weight of a gaming device over time. Thus, the top surface is susceptible to bending, cracking and warping.

Another gaming device base is disclosed in Ward (U.S. Pat. No. 6,042,115). The gaming device base is designed to support modified slot machines that have reduced coin hopper size, reduced power supply size and a circuit board positioned at an angle. (See also U.S. Des. Pat. Nos. 399,889 and 409,857, issued to the same inventor). Ward discloses that the combination of the slot cabinet and the modified slot machine is designed to reduce the amount of floor space occupied by gaming devices, which is especially valuable in casino environments.

One problem with Ward's slot cabinet is that it requires complicated modifications to the gaming device before the slot cabinet can effectively support the gaming device. For example, the gaming device has to be modified by reducing the coin hopper size, reducing the power supply size, and positioning the circuit board at an angle. Next, while Ward's slot cabinet allows players to sit closer to the gaming device, the front wall blocks the players' legs and does not allow players to extend or stretch their legs. There is a long felt and unmet need for a gaming device base that has a front surface that does not block the players' legs and that allows players to stretch their legs.

Ward's slot cabinet further does not include any footrests. While the space between the bottom of the front wall and the floor allows players to insert their toes to be closer to the gaming machine, there are no structures that elevate players' feet and allow players to rest their feet.

Another gaming device base is disclosed in Rowe et al. (U.S. Pat. No. 6,116,597). The gaming device base has a foot rail positioned in front of the gaming device base. The foot rail disclosed may be fixed or foldable. One problem with the Rowe et al. foot rail is that the rail is made of a tube or a rod and is not supported by the floor. A footrest supported by the floor is desired because it is more stable and durable than a rail merely mounted on the front wall of the gaming device base. Another problem with the foot rail disclosed in Rowe et al. is that the rail does not support the entire surface area of the players' feet. As a result, players' feet may slide away from the foot rail. Players are likely to exert extra effort to keep their feet on the rail. A footrest having the ability to support a substantial portion of a player's foot is therefore desired.

Gaming device bases are known to store coins. For example, slot machines typically have hoppers that store and dispense coins. Hoppers are typically limited in size and regularly become full. When the hoppers are filled with coins, coins are diverted to an overflow bucket disposed inside the gaming device bases. Coin passages are located on the bottom of slot machines. Coins from slot machines pass through the coin passages and are received by coin buckets disposed in the slot bases.

A gaming device base that stores coins is disclosed in Salour et al. (U.S. Pat. Nos. 5,876,285 and 6,146,274). The gaming device base has a hopper for storing coins positioned inside the cabinet and a mechanism for emptying the hoppers. Coins from the gaming device drop through a coin passage to the hopper. The hopper has a chute and chute door, which may be opened and closed. During coin collection and counting, a casino employee would open the slot cabinet door, close the chute door, and move the chute toward him. The employee may then position a bucket underneath the chute and open the chute door to discharge the coins to the bucket thereby emptying the hopper.

One problem with the gaming device base in Salour et al. is that it requires employees, who may regularly remove the coin buckets for weighing and counting of coins, to lift coin buckets off the floor. Employees have to bend and lift the coin buckets, thus increasing the risk of back injuries. There is a long felt and unmet need for a gaming device base with coin buckets or receptacles positioned on top of the gaming device base or off the floor.

Gaming device bases are further known to store electrical wires. Examples of electrical wires include communication wires, power supply wires, wires for hoppers, wires for electronic locks and wires for the sensors of coin buckets. Gaming operators desire to hide the wires as discreetly as possible for aesthetic reasons as well as to prevent their patrons from tripping over the wires. Gaming operators conventionally hide the electrical wires by running the wires across the slot base and storing the wires inside the slot base. One problem with this technique is that electrical wires, which are not isolated from the vicinity of the coin path as the coins move from the gaming machine to the base, deflect coins coming from gaming device thereby causing coins to be lost. A gaming device base that isolates the electrical wires from the vicinity of the coin path is therefore desired.

Additionally, with the introduction of cashless and coinless, or non-currency, gaming devices, there has evolved an unmet need in the gaming industry for a gaming device base configured for storing non-currency gaming items such as, for example, tickets, vouchers, smart cards, vip cards, player cards and credit cards. In this respect, bins for and storage of currency, that is, cash and/or coins, are no longer essential features of the gaming device base.

Accordingly, various non-currency gaming devices are configured to accept, as well as to dispense, non-currency gaming items. With respect to dispensing, the gaming device will dispense to the player a non-currency gaming item when a player stops playing the game and "cashes-out" his or her winnings. In this way, players are able to experience uninterrupted play by using the dispensed non-currency gaming item with another non-currency gaming device.

Naturally, there are times when non-currency gaming devices must be re-supplied in order to continue dispensing non-currency. As such, it would be advantageous to have a gaming device base configured to store one or more non-currency gaming items that can be accessed for the re-supplying of a non-currency gaming device. This type of gaming device base would provide a certain level of convenience for individuals, such as casino employees, insofar as they would be able to avoid transporting on their person large quantities of non-currency gaming items. Also, the use of non-currency gaming items permits employees to avoid transporting large amounts of currency. The non-currency gaming items further are much lighter than the coins traditionally used with gaming devices such that the lifting of heavy coins is eliminated, as well as the constant bending and lifting associated therewith which increases the risk of back injuries.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to eliminate the need for currency storage, including coin bins;

eliminate the lifting and constant bending by employees associated with use of heavy coins;

provide easy access to non-currency gaming items;

allow an employee to avoid transporting non-currency as well as currency;

provide for secure storage of non-currency (cashless) gaming devices; and provide for the re-supply of non-currency gaming devices.

These and other advantages may be realized by reference to the remaining portions of the specification, claims and abstract.

Brief Description of One Embodiment of the Present Invention

Applicants have provided a gaming device base configured to store at least one non-currency gaming item including cashless devices, such as, for example, tickets, vouchers, smart cards, vip cards, player cards and credit cards. In one embodiment, the gaming device includes a horizontal support member having a substantially flat surface configured to support one or more gaming devices. At least one door, having an exterior and interior surface, of the gaming device base is positioned underneath the horizontal support member and the interior surface includes a storage area. The storage area is configured to store at least one non-currency gaming item. The door further is moveable from a closed position to an open position to provide access to the storage area.

Additionally, applicants have provided a gaming device base having a front surface that allows players to stretch their legs. In one embodiment, the gaming device base has a horizontal support member having at least one edge and a substantially flat surface to support at least one gaming device. The gaming device base has at least one door positioned behind the edge of the horizontal support member and beneath the horizontal support member. The door has at least one angled portion, which forms an acute angle measured from a vertical plane, and a storage area configured to store one or more non-currency gaming items. The door may be moved to an open (to provide access to the storage area) or closed position. In the closed position, the door is positioned behind the edge of the horizontal support member. Players sitting in front of the edge of the horizontal support member may stretch their legs behind the edge of the horizontal support member.

The applicants have also provided a gaming device base having a footrest supported by a floor and that is capable of supporting a substantial portion of players' feet. In another embodiment, the footrest has a footrest plate resting on footrest plate support members, which typically rests on the floor.

In yet another embodiment, the applicants have provided a gaming device base having a horizontal support member able to withstand the weight of a gaming machine positioned thereon over time. The horizontal support member is typically made resilient by a beam positioned underneath the horizontal support member.

The applicants further have provided a method for storing at least one non-currency gaming item including cashless devices, such as, for example, tickets, vouchers, smart cards, vip cards, player cards and credit cards, in a gaming device base. In one method, at least one non-currency gaming item is provided along with a gaming device base having a horizontal support member. The horizontal support member has a substantially flat surface configured to support one or more gaming devices. The gaming device base further includes at least one door, having an exterior and interior surface, positioned underneath the horizontal support member. The interior surface of the door includes a storage area configured to store the at least one non-currency gaming items. The door further is moveable from a closed position to an open position to provide access to the storage area. If the door is in the closed position, the door is moved from the closed position to the open position to provide access to the storage area. The at least one non-currency gaming item then is placed in the storage area.

The above description sets forth, rather broadly, a summary of some embodiments of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF AN EMBODIMENT OF THE PRESENT INVENTION

In the following detailed description of various embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The present invention comprises a gaming device base, generally indicated by reference number 20. The terms "base," "support device," "slot base," and "gaming device base" are used interchangeably to refer to a device used for supporting a gaming device. "Gaming devices" is a term used to refer to gambling machines and arcade machines. Gambling machines include, for example, slot machines with reel or video displays, gaming tables and machines typically found in casinos. Arcade machines include, for example, video games and machines typically found in arcade establishments.

The terms "coin bin," "receptacle," and "coin bucket" are used interchangeably to refer to a receptacle configured to receive coins, currencies or other items used as a wager or a prize. The term "coin" is used interchangeably with currencies or other items used as a wager or a prize. As used herein, the term "door" refers to any barrier by which an entry is closed and opened. Alternatively, the term "door" refers to an immovable wall used to enclose the confines of the gaming device base.

Figure 1:
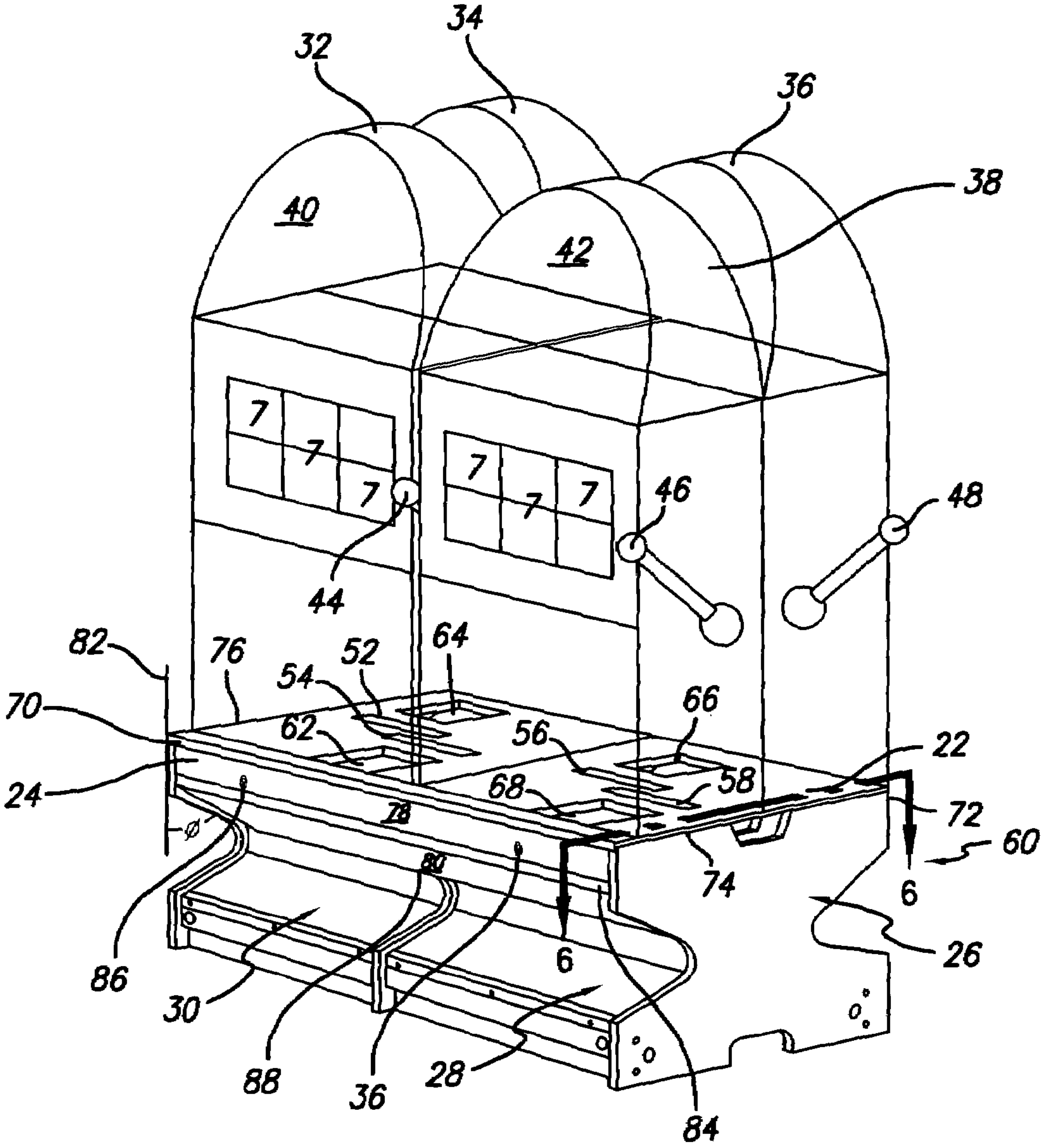
FIG. 1 is substantially a perspective view of an embodiment of the gaming device base wherein the gaming device base accommodates four gaming devices, two gaming devices being positioned on each side of the gaming device base.

Referring now to FIG. 1, an embodiment of a gaming device base 20 is shown. Gaming device base 20 may have a horizontal support member 22, a door 24, a support structure 26, and footrests 28 and 30. Horizontal support member 22 typically has a flat surface to support gaming devices 32, 34, 36 and 38. Horizontal support member 22 typically has a front edge 70, a back edge 72 and side edges 74 and 76. A player may sit in front of front edge 70 to play gaming device 32. Another player may sit in front of back edge 72 to play gaming device 36. Back edge 72 may also be positioned adjacent to a wall (not shown). Side edge 74 may be positioned adjacent to another gaming device base (not shown). Horizontal support member 22 may have a rectangular shape, but other shapes, such as square, triangle or circle, may be employed. Gaming devices 32, 34, 36 and 38 may be positioned on top of horizontal support member 22.

Horizontal support member 22 is typically configured to accommodate a plurality of gaming devices 32, 34, 36 and 38. Of course, horizontal support member 22 may be configured to accommodate one or various numbers of gaming devices. Gaming devices 32 and 34 may be positioned back-to-back, and so may gaming devices 36 and 38. Gaming devices 32 and 38 may be positioned side-by-side, and so may gaming devices 36 and 34. Of course, horizontal support member 22 may be configured to accommodate gaming devices in varying positions, such as back-to-back, side-by-side and in series.

Each gaming device 32, 34, 36 and 38 may have a coin acceptor (not shown), a coin tray (not shown), bonus display 40 and 42, a handle 44, 46, and 48, a button (not shown), a hopper (not shown), and a power supply (not shown). The power supply may have wires (not shown) that are connected to a power outlet located on a floor (not shown).

Horizontal support member 22 may define wire passages 52, 54, 56 and 58. Wire passages 52, 54, 56 and 58 allow electrical wires, such as power supply wires, to be hidden within gaming device base 20. At least one wire passage 52, 54, 56 or 58 may be disposed on horizontal support member 22 for every space allocated on horizontal support member for gaming device 32, 34, 36 and 38. Wire passages 52 and 54 and wire passages 56 and 58 are typically offset relative to each other on horizontal support member 22 to isolate wires of each gaming device 32, 34, 36 and 38. Electrical wires of gaming devices 32, 54, 34 and 38 may run to the floor through wire passages 54, 52, 58 and 56, respectively.

Horizontal support member 22 may further define coin passages 62, 64, 66 and 68. When a hopper (not shown) positioned inside a gaming device 32, 34, 36 or 38 is filled with coins, coins fall from gaming device 32, 34, 36 or 38 to the confines of gaming device base 20 through coin passages 62, 64, 66 and 68. Typically, at least one coin passage is provided for each gaming device supported on the horizontal support member. Coin passages 62 and 64 and coin passages 66 and 68 are typically offset relative to each other on horizontal support member 22 to isolate coin paths of coins inside each gaming device 32, 34, 36 and 38 and to prevent coins from coming out of gaming devices 32, 34, 36 and 38 and mixing with each other. This is desirable in most gaming establishments to accurately account for coins produced by each gaming device.

In another embodiment, gaming device base 20 has a door 24 located beneath horizontal member 22. Door 24 may be moveable from a closed position shown in FIG. 1 to an open position (not shown in FIG. 1). In the closed position, door 24 is typically positioned behind front edge 70 of horizontal support member 22. Door 24 may have a straight portion 78, which is parallel to a vertical plane 82, and an angled portion 80, which may form an acute angle (indicated in FIG. 1) measured from a vertical plane 82. When door 24 is in the closed position, door 24 allows players sitting in front of a horizontal support member edge 70 or back edge 72, to stretch their legs behind the horizontal support member edge. Intersection 84 between straight portion 78 and angled portion 80 may be a smoothly rounded surface for aesthetic appeal and to minimize any unpleasant contact by players. Door 24 may further have different shapes, such as shapes that would allow players to stretch their legs underneath horizontal support member 22 or behind the horizontal support member edge.

Door 24 may have at least one lock 86 attached on straight portion 78 of door 24. In one embodiment, lock 86 is a manual cylinder lock. In other embodiments, lock 86 may comprise an electronic lock, bolt or other locks known in the art. Door 24 is typically made of galvanized steel, but may be made of other materials, such as, for example, aluminum, non-galvanized steel, wood, combination of polyvinyl chloride film on MDF (medium density fiberboard) core, plastic, acrylic, fiberglass or other related materials known in the art.

Figure 2:
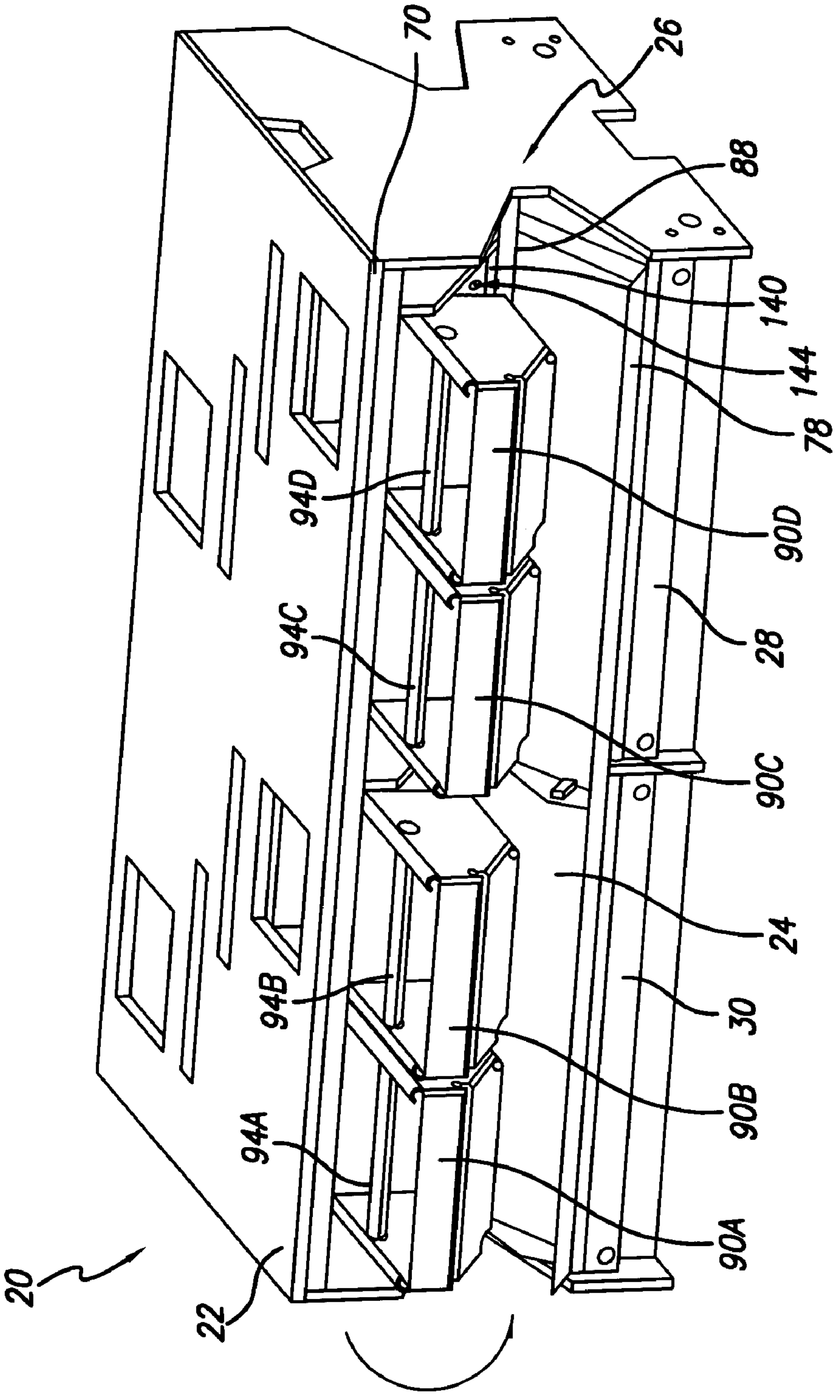
FIG. 2 is substantially a perspective view of the gaming device base of FIG. 1 showing the door in an open position and the coins bins slid forward.

Door 24 is typically a swing door that is attached to a support structure 26 by a continuous hinge (not shown), such as a piano hinge, at door 24's hinged portion 88. Door 24 may also be rotatably attached to support structure 26 using a non-continuous hinge or other fasteners known in the art. Referring now to FIG. 2, door 24 is shown in its open position. When door 24 moves from a closed to an open position, door 24 typically moves in a swinging motion wherein straight portion 78 drops from a top position adjacent to horizontal support member 22 to a bottom position away from horizontal support member 22 and adjacent to footrests 28 and 30. Hinged portion 88 typically remains attached to support structure 26 (see also arrow indicating door motion in FIG. 2). When door 24 is in an open position, a horizontal compartment 144, defined by horizontal support member 22 and horizontal partition 140, may be accessed. Horizontal compartment 144 may be configured to store coin bins 90A–D, which are used to receive coins coming from gaming devices through coin passages (not shown in FIG. 2) and store coins in gaming device base 20. In another embodiment, a single door 24 provides access to a plurality of coin bins 90A–D. In yet another embodiment (not shown), individual doors may be provided to access each coin bin.

In another embodiment, one coin bin 90A, 90B, 90C or 90D for every gaming device 32, 34, 36 and 38 is provided. Coin bins 90A–D may be positioned side-by-side. In another embodiment (not shown), vertical coin bin partition may be provided between coin bins to further prevent coins from mixing. Typically, coin bins 90A–D may only be accessed from one side and usually from the front side of gaming device base 20 or from the side of gaming device base 20 adjacent to front edge 70.

Rear door (not shown in FIG. 3) may be similar to door 24 described above. The rear door may also be permanently closed. In an alternative embodiment (not shown), no door similar to door 24 is provided at the rear of gaming device base. The rear surface of gaming device base 20 is a substantially flat surface. The flat surface is especially practical when the rear of gaming device base 20 is configured to face a wall.

Figure 3:
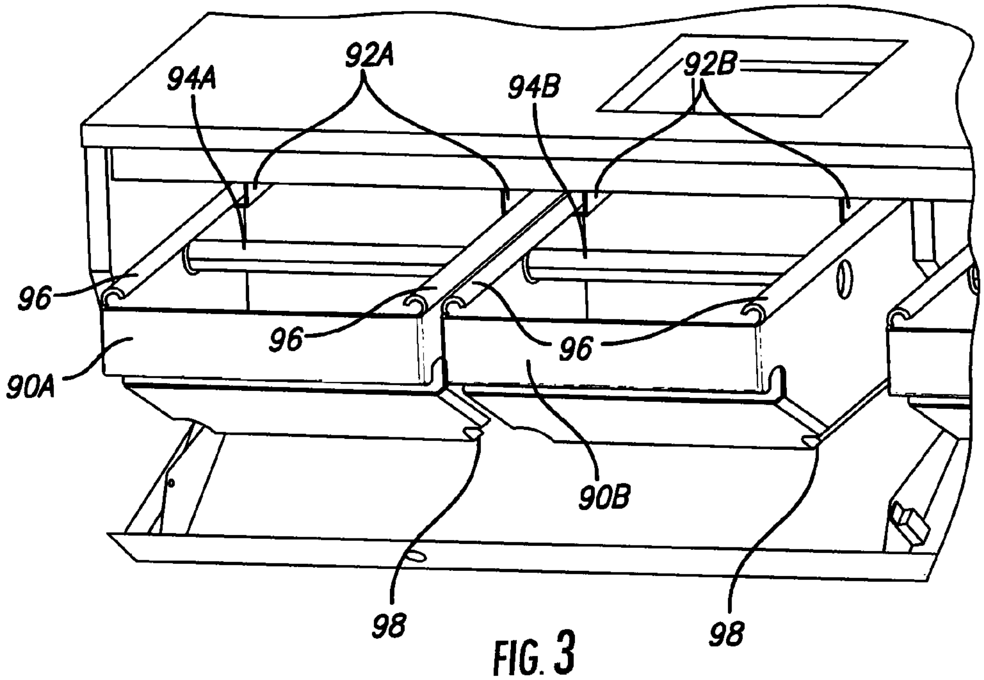
FIG. 3 is substantially a closer view of a portion of FIG. 2 showing the components of the slidable coin bins and their respective attachments.

Referring now to FIG. 3, each coin bin 90A–D typically has a plurality of walls that define a box. The top of each coin bin 90A–D may include an opening to receive coins being dropped from corresponding gaming devices 32, 34, 36 and 38 (not shown in FIG. 3). Each coin bin 90A–D may further have a handle 94A–D disposed within the confines of each coin bin 90A–D and typically in the middle of each coin bin or any position that would allow a user to carry the coin bin in a balanced manner. Handle 94A–D may be a rod having one end attached to a side of a coin bin and another end attached to another side of the coin bin.

Each coin bin 94A–D typically has a pair of glides 96, one glide being attached on top of each of the coin bin's sidewalls to allow each coin bin 94A–D to be removeably attached to horizontal support member 22 and to be slid within the confines of horizontal support member 22. Each coin bin 94A–D may further be made stackable by providing a pair of recesses 98 on the bottom of each coin bin, so that when a coin bin is positioned on top of another, the pair of glides 96 of the bottom coin bin may be accommodated by pair of recesses 98 of the top coin bin. Each coin bin 94A–D is typically made of molded polypropylene. It is understood that coin bins 94A–D may be made using other materials known in the art, such as, for example, metal, wood, composites and other polymers.

Figure 4:
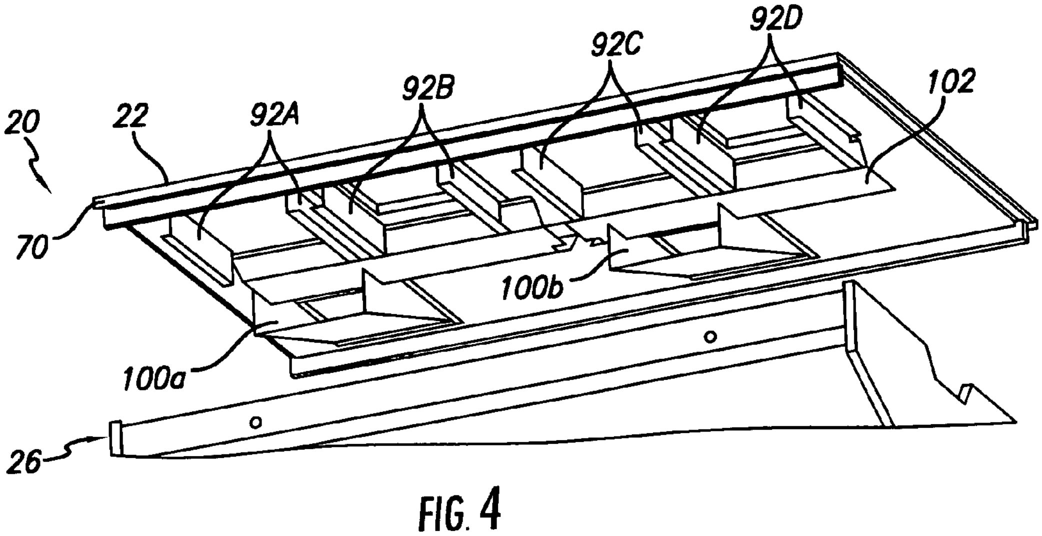
FIG. 4 is substantially a view of the underside of the horizontal support member of the gaming device base of FIG. 1.

Referring now to FIG. 4, a plurality of sets of tracks 92A–D may be attached to and directly beneath horizontal support member 22. Each set of tracks 92A–D is typically configured to receive corresponding pair of glides 96 (shown in FIGS. 2 and 3) so that glides 96 and coin bins 90A–D may be quickly attached to, detached from, and moved beneath horizontal support member 22. This removable and movable feature of coins bins 90A–B may be helpful in weighing and counting coins on a regular basis.

Each track 92A–D is typically L-shaped having a vertical component and a horizontal component. Of course, each track may have other shapes known in the art. One end of the vertical component of each track is typically attached to horizontal support member 22, and the other end is typically attached to the horizontal component. The horizontal component of each track is typically parallel to the plane of horizontal support member 22 and is configured to facilitate the sliding movement of the coin bins (not shown in FIG. 3). One set of tracks 92A, 92B, 92C or 92D may be provided for every coin bin (not shown in FIG. 3) that gaming device base 20 is designed to accommodate. In one embodiment, one coin bin is provided for every gaming device so that coins from different gaming devices are not mixed. Thus, the number of sets of tracks may vary depending on the number of coin bins or the number of gaming devices that gaming device base 20 is designed to accommodate.

In another embodiment, where coin bins may only be accessed from one side (typically from the front side) of gaming device base 20 (hereinafter referred to as the accessible side), the length of each set of tracks and each coin bin may be substantially half the width of horizontal support member 22. A first vertical partition 147 (not shown in FIG. 4 and further discussed below) may provide a stop for coin bins 90A–D and may further prevent coin bins 90A–D from further sliding toward the inside of gaming device base 20 and becoming detached from tracks 92. Usually there are no coin bins directly underneath gaming devices positioned on the other half of horizontal support member 22, typically the rear or back side of gaming device base 20, which is hereinafter referred to as the inaccessible side. Coin bins for gaming devices that are positioned on the inaccessible side may be positioned on the accessible side and may be provided with chutes 100A–B so that coins being dropped from the gaming devices are directed to their corresponding coin bins. Chutes 100A–B typically have a flat surface attached to horizontal support member 22 in a diagonal position relative to horizontal support member 22. Chutes 100A–B may further have sidewalls perpendicular to the flat surface and to the horizontal support member to provide a barrier for the coins being dropped from a gaming device to a corresponding coin bin. Chutes 100A–B may be made of galvanized metal, but other materials known in the art may be used, such as, for example, plastic and wood.

An elongated wire chase 102 may be attached to horizontal support member 22 directly underneath wire passages 52, 54, 56 and 58 (shown in FIG. 1) and substantially between each set of tracks 92A–D and chutes 100A–B. Wire chase 102 may have a concave cross sectional shape to accommodate wires. A portion of chute 100A–B may overlap an exterior bottom portion of wire chase 102. Wire chase 102 may be configured to receive electrical wires from gaming devices 32, 34, 36 and 38 and wire passages 52, 54, 56 and 58 (shown in FIG. 1). Wire chase 58 is further configured to isolate electrical wires from coins being dropped to coin bins 90A–D (shown in FIGS. 2 and 3). Wire chase 58 may be made of galvanized steel, but other materials known in the art may be used, such as, for example, plastic, rubber and polyvinyl chloride.

Figure 5:
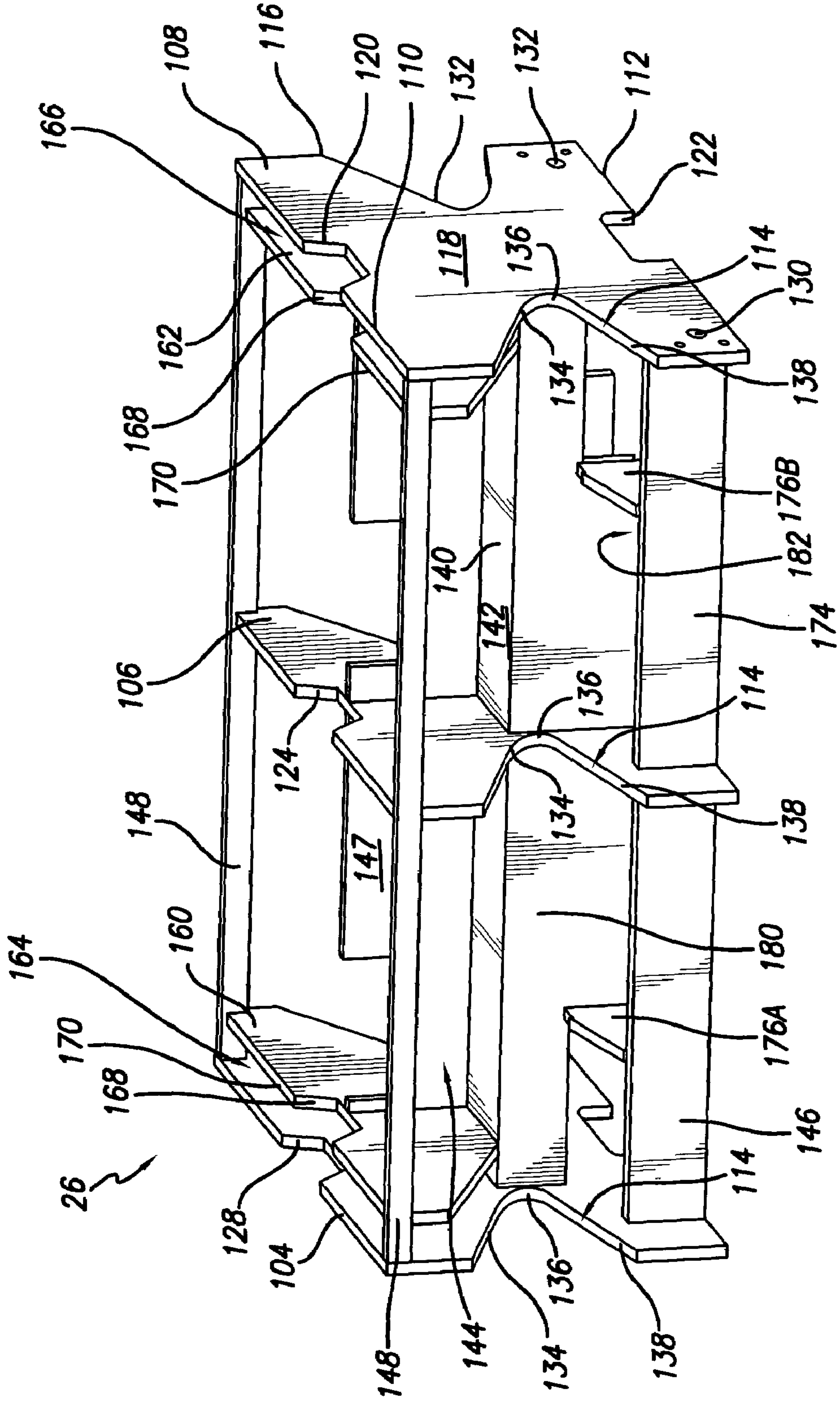
FIG. 5 is substantially a perspective view of the support structure of the gaming device base of FIG. 1.
Figure 6:
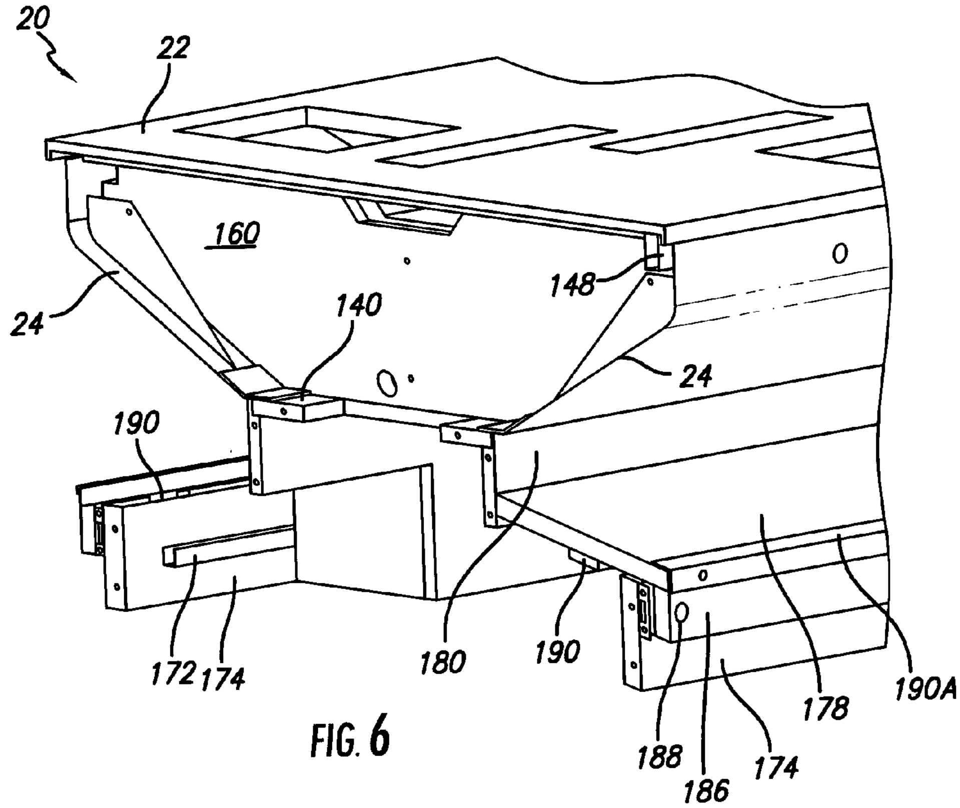
FIG. 6 is substantially a cross-sectional view of the gaming device base of FIG. 1 taken along line 6 indicated on FIG. 1.

Referring now to FIGS. 5 and 6, an embodiment of support structure 26 configured to support horizontal support member 22 from a floor is shown. Support structure 26 typically may have three vertical members 104, 106 and 108 perpendicularly attached to horizontal support member 22 (not shown in FIG. 5). Vertical members 104, 106 and 108 are typically attached to side edge 76, a middle portion and side edge 78 of horizontal support member 22 (seen in FIG. 1). It is understood that the number of vertical members and their positions relative to horizontal support member 22 may vary.

Each vertical member 104, 106 and 108 is typically made of a flat piece of material having a surface 118 and top 110, bottom 112, front 114, and back 116 edges surrounding surface 118. Top edge 110 typically defines a recess 120, 124 and 128 to accommodate wire chase 102 (not shown in FIG. 5) or electrical wires. Bottom edge 112 may also define a recess 122 to allow wires stored within the confines of gaming device base 20 to exit and typically to run to another gaming device base 20 (not shown). Surface 118 may define at least one passage 130 and 132 to allow wires stored within the confines of gaming device base 20 to exit and typically to run to another gaming device base 20 (not shown).

Each front 114 and back 116 edge typically has a top portion, which further has a recess 134 that substantially follows the shape of door 24 in a closed position described above and seen in FIG. 1. Each front 114 and back 116 edge may have a middle portion 136 that is substantially parallel to a vertical plane. Each front 114 and back 116 edge may further have a bottom portion forming a leg 138 extending forward and toward the front of a gaming device. It is understood that the shapes and sizes of vertical members 104, 106 and 108 may vary.

Support structure 26 may further include at least one horizontal partition 140. Horizontal partition 140 is typically a flat rectangular piece of material having a surface 142. Horizontal partition 140 may be disposed horizontally in between vertical members 104 and 108 and across vertical member 106. Horizontal support member 22 and horizontal partition 140 may define a first compartment 144, typically reserved for coin bins. Vertical member 104 typically divides compartment 144 into a left side sub-compartment and a right side sub-compartment. A first vertical partition 147 may be positioned transverse from horizontal partition 140 and perpendicular to vertical member 104. First vertical partition 147 further divides compartment 144 into a front sub-compartment and a rear sub-compartment. First vertical partition 147 further provides a stop for coin bins 90A–D (not shown in FIG. 5) and prevents coin bins 90A–D from further sliding toward the inside of gaming device base 20 and becoming detached from tracks 92 (not shown in FIG. 5). First vertical partition 147 may further include recesses for allowing chute 100 (not shown in FIG. 5) to extend from horizontal support member 22 to a coin bin 90A, 90B, 90C or 90D.

Support structure 26 may further have a second vertical partition 180. In one embodiment, second vertical partition 180 is positioned in front of and below horizontal partition 140, in between vertical members 104 and 108, across vertical member 106, and at a height substantially equal to the height of middle portion 136 of front edges 114 of vertical members 104, 106 and 108. Support structure 26 may further include at least one board 174 attached to the legs 138 of vertical members 104, 106, and 108. Board 174 is typically a flat piece of rectangular galvanized steel positioned in between vertical members 104 and 108 and across vertical member 106. Board 174 may also be made of triple-enforced wood with PVC (polyvinylchloride) face, non-galvanized steel, aluminum and other materials known in the art. Second vertical partition 180, a second horizontal partition adjacent to the floor (not shown), and board 174 may define a compartment 182. Compartment 182 is typically reserved for storage of coins and usually for awarding a jackpot winner. Compartment 182 may further be reserved for storing electrical wires. Compartment 182 may be divided into a left side sub-compartment and a right side sub-compartment by leg 138 of vertical member 106. Third vertical partitions 176A and 176B may further be positioned perpendicular to board 174 and in between board 174 and second vertical partition 180. Third vertical partitions 176A and 176B may further divide compartment 182 into four compartments arranged side-by-side.

Figure 7:
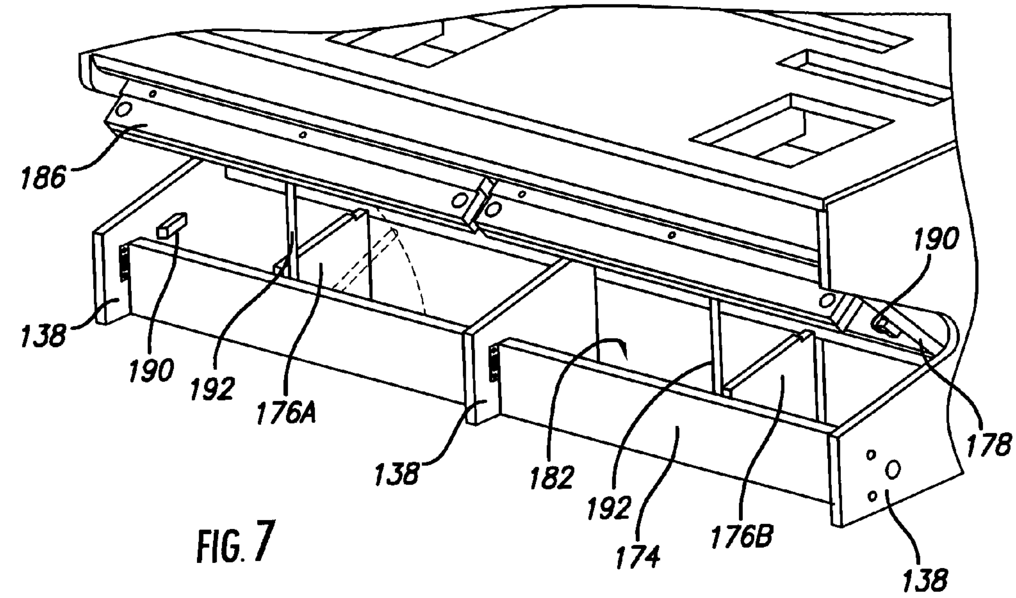
FIG. 7 is substantially a closer view of a portion of FIG. 1 showing the components of the footrest and its respective attachments.

Referring now to FIGS. 6 and 7, door 24 may be attached on horizontal partition 140 by a hinge, typically by a continuous piano hinge. A footrest plate 178 may be attached to second vertical partition 180. Footrest plate 178 is typically attached to second vertical partition 180 by a continuous hinge to allow footrest plate to swing up and down. Footrest plate 178 typically moves from an open position to a closed position to provide access to compartment 182 (shown in FIG. 5) or sub-compartments of compartment 182. In the closed position, footrest plate 178 is typically in a substantially horizontal position or diagonal position and resting upon board 174. In the open position, a stand 192 may be provided to support plate 178 in the open position. Stand 192 may be attached to partitions defining compartment 182. Typically, stand 192 is moveable from a substantially horizontal position when plate 178 is in a closed position to a substantially transverse position when plate 178 is in an open position. Plate 178 may be made of a range of materials, such as, for example, metal, galvanized steel, non-galvanized steel, wood and related materials known in the art. Plate 178 may further be covered with carpet, or other materials that would protect plate 178 from scratches or provide plate 178 with additional appeal.

A plate extension 186 may be attached substantially perpendicular to footrest plate 178 to firmly engage footrest plate 178 to board 174 when in the closed position. A lock 188 may be attached to plate extension 186 so that footrest plate 178 may be lockable when in the closed position. Lock 188 may be a plunger-type lock or a deadbolt lock, but may comprise other locks known in the art. A security sensor 190 may further be provided to monitor the opening and closing of footrest plate 178 or to control the access to compartment 182. Sensor 190 may be optical sensors, or other sensors known in the art. In one embodiment, a plate edge cover 190A is positioned on the front edge of footrest plate 178. Plate edge cover 190A protects footrests 28 and 30 from wear and scratches. Plate edge cover 190A is typically made of metal, but may be made of plastic, fiberglass, acrylic, powder coating and other materials known in the art.

Support structure 26 may also comprise additional components that further strengthen support structure 26 in supporting the weight of gaming devices, such as, for example, brackets, and braces. Support structure 26 is typically made of wood, but may be made of other materials, such as, for example, steel and aluminum. The number and shapes of partitions may vary.

Referring back to FIG. 5, gaming device base 20 may further have at least one, typically two, vertical wire partitions 160 and 162. Each vertical wire partition is typically a flat piece of material having a surface surrounded by top, bottom, front and back edges. Top edge 170 may define a recess 168 to accommodate wire chase 102 (shown in FIG. 4). The outer surfaces of vertical wire partition 160 and vertical member 104 define a gap 164 in between them. Electrical wires run through wire chase 102 (shown in FIG. 4) then through gap 164. The outer surfaces of vertical wire partition 162 and vertical member 108 define a gap 166 in between them. Electrical wires run through wire chase 102 (shown in FIG. 4) then through gap 166. A bottom wire chase 172 (shown in FIG. 6) extending through almost the entire length of board 174 may be provided to receive the wires coming from gaps 164 and 166. It is understood that the number of bottom wire chases may vary. Bottom wire chase 172 may be made similar to wire chase 102, but may of different dimensions than wire chase 102.

With continued reference to FIG. 5, vertical wire partitions 160 and 162 and vertical member 106 may define a notch (not shown in FIG. 5) at their respective front and back edges. Each notch may be configured to receive and support a beam 148. Beam 148 may be provided in front of gaming device base 20 beneath front edge 70 of horizontal support member 22 and at the back of gaming device base 20 beneath back edge 72 of horizontal support member 22. Beam 148 is configured to add strength to horizontal support member 22 in supporting the weight of gaming devices 32, 34, 36 and 38 (shown in FIG. 1). Beam 148 is typically made of heavy gauged steel tube, but other materials known in the art may be used. Beam 148 may further be in the form of a shaft, a C-channel, a rod and other structures and shapes known in the art. Beam 148 may be configured to receive locking portion (not shown) of door lock 86 (shown in FIG. 1). It is noted that beam 148 may provide door 24 with a sturdy locking mechanism that may be difficult to tamper with, as the locking portion engages to a metal.

In another embodiment (not shown), a second horizontal partition may be provided beneath first horizontal partition 140. First horizontal partition 140 and second horizontal partition may define a second compartment. First horizontal partition 140 and second horizontal partition may further define wire holes for securing and isolating electrical wires. The second compartment may be reserved for storing pre-counted currency to be awarded to a player, a jackpot winner, or for some other purpose. The second compartment may further comprise second compartment doors. Boxes or drawers may also be disposed within the second compartment. Additional horizontal partitions may be added to define additional compartments (not shown). Additional horizontal shelves or vertical compartment partitions may also be provided.

In another embodiment (not shown), gaming device base 20 has only one horizontal partition similar to horizontal partition 140. Underneath the horizontal partition, a panel is attached to support structure 26 at an acute angle measured from the horizontal partition. The panel may have a reflective surface to reflect light and to add appeal to gaming device base 20. The panel may be made of materials such as, for example, wood with laminate, durable carpet and rubber flooring sheet surface. The panel may also be a metallic sheet, such as stainless steel or aluminum. Low-voltage rope lighting or other alternative lighting may be added below the horizontal partition to add attraction to gaming device base 20.

Figure 8:
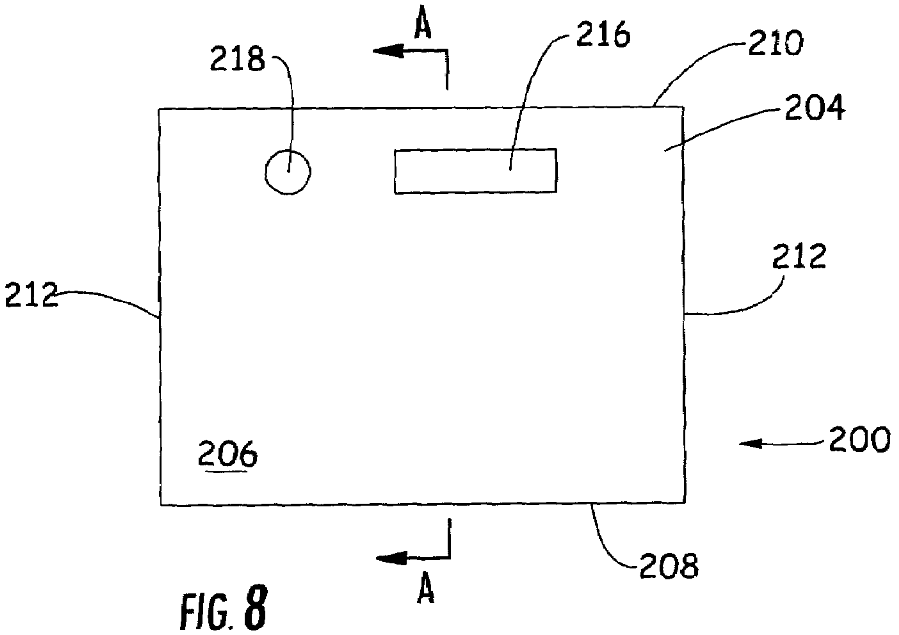
FIG. 8 is a top plan view of one embodiment of the gaming device base of the present invention.
Figure 9:
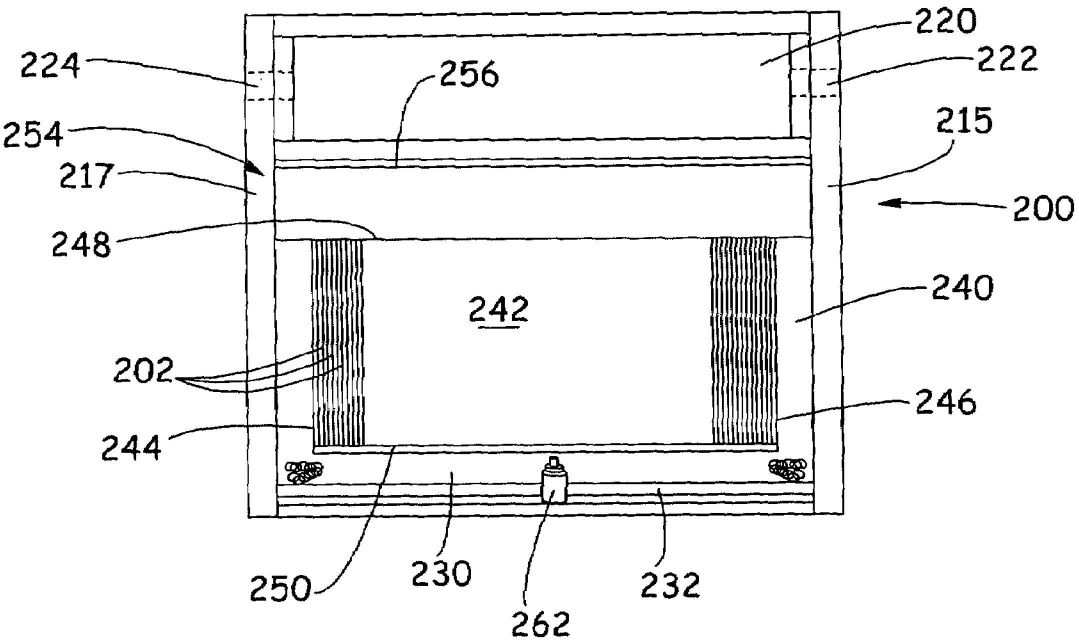
FIG. 9 is a top plan view of the gaming device base of FIG. 8 with the horizontal support member removed.
Figure 10:
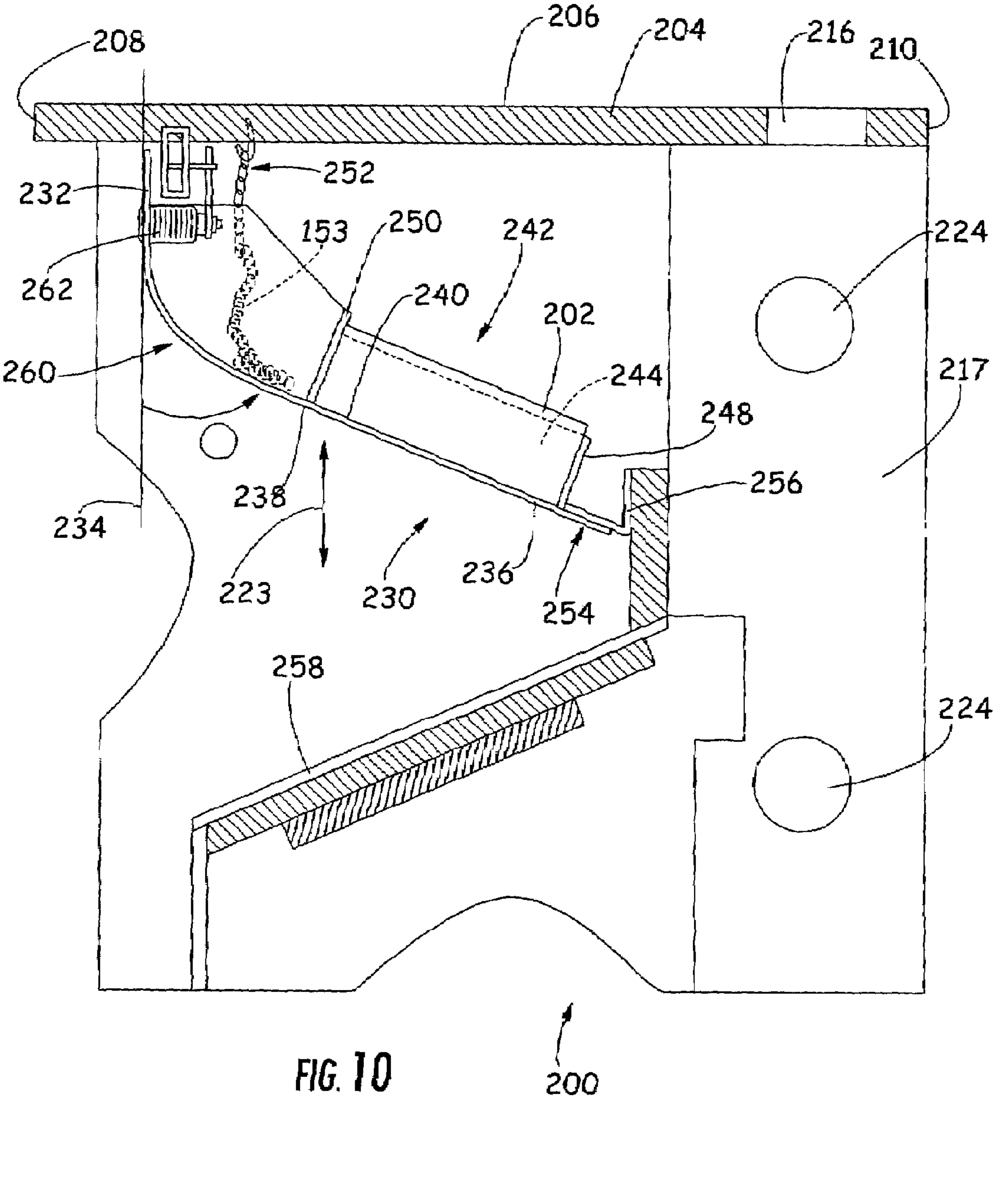
FIG. 10 is a sectional view of the gaming device base of FIG. 8 taken along line A-A.

FIGS. 8–10 illustrate various embodiments of the present invention wherein a gaming device base 200 is configured to store at least one non-currency gaming item 202, including cashless devices, such as, for example, tickets, vouchers, smart cards, vip cards, player cards and credit cards.

As shown in FIG. 8, a horizontal support member 204 has a flat surface 206 configured to support a gaming device (not shown). It is understood that the horizontal support member 204 may be configured to accommodate a plurality of gaming devices (not shown). Horizontal support member 204 typically has a front edge 208, a back edge 210 and side edges 212. A player (not shown) may sit in front of front edge 208 to play the gaming device. Horizontal support member 204 is supported by vertical support members 215 and 217 (see FIG. 9) and typically has a rectangular shape, but other shapes, such as a square, triangle or circle, may be employed.

Each gaming device (not shown) supported by the gaming device base 200 may have a non-currency acceptor (not shown), a non-currency dispenser (not shown) and a power supply (not shown). The power supply may have wires (not shown) that are connected to a power outlet located on a floor (not shown).

As further shown in FIG. 8, the horizontal support member 204 may define wire passages 216 and 218. The wire passages 216 and 218 allow electrical wires, such as power supply wires (not shown), to be hidden within the gaming device base 200. At least one wire passage 216, 218 may be disposed on horizontal support member 204 for every space allocated on horizontal support member 204 for a gaming device(s) (not shown). Electrical wires of a gaming device(s) may run to the floor through wire passages 216, 218, respectively. Accordingly, the wire passages 216, 218 may include any number of shapes and sizes.

FIG. 9 shows a wire compartment 220 situated below the wire passages 216, 218 configured to receive and hide wires from a gaming device. Additional wire passages 222 and 224 may be presented in vertical support members 215 and 217 to allow the passage of wires therethrough to, for example, electrical outlets.

As shown in FIG. 10, the gaming device base 200 has a door 230 beneath the horizontal member 204. The door 230 may have a straight portion 232, which is parallel to a vertical plane 234, and an angled portion 236, which may form an acute angle measured from the vertical plane 234. The door 230 further includes exterior and interior surfaces 238 and 240, respectively. The interior surface 240 has a storage area 242 configured to store one or more non-currency gaming item 202, including for example, tickets, vouchers, smart cards, vip cards, player cards and credit cards. Typically, the storage area 242 rests above the angled portion 236 of the door 230. The storage area 242 includes at least two walls 244 and 246 (see FIG. 9), typically four walls 244, 246, 248 and 250 (FIG. 9), to retain non-currency gaming items 202 within the storage area 242.

It is understood that storage area 242 may comprise one or more partitions (not shown), for example, vertical or horizontal partitions, to further subdivide storage 242 into a plurality of sub-compartments (not shown), similar to the sub-compartments previously presented in the discussion of FIG. 5. In this embodiment (involving storage area 242), the sub-compartments may be used to store a variety of different non-currency items without the different non-currency items becoming mixed with one another.

The door 230 may be moveable from a closed position to an open position, and vice versa, as represented by numeral 223. In the closed position, the door 230 is typically positioned behind front edge 208 of horizontal support member 204. When door 230 is in the closed position, the door 230 allows a player (not shown) sitting adjacent the front edge 208, to stretch his or her legs behind the front edge 208. In the open position, access is provided to the storage area 242 for replenishing of and/or for removing the non-currency gaming items 202. In this way, individuals, such as casino employees, may replenish the non-currency supply of a gaming device (not shown) without having to transport the non-currency gaming items 202 on their person. Notably, one of the walls 244, 246, 248, 250, typically wall 250, may be provided longer in length, in relation to the door 230, to better retain the non-currency gaming items 202 within the storage area 242 when the door 230 is in the open position.

As shown in FIGS. 9 and 10, door 230 typically is a swing door that is attached to the gaming device base 200 at one end 254 of the angled portion 236, by a continuous hinge 256, such as, for example, a piano hinge. The door 230 may also be rotatably attached using a non-continuous hinge or other fasteners known in the art. When the door 230 moves from the closed to the open position, as represented by numeral 223 in FIG. 10, the door 230 typically moves in a swinging motion wherein straight portion 232 drops from a top position adjacent to horizontal support member 204 to a bottom position away from horizontal support member 204 and adjacent to footrest 258. A retention device 252, such as, for example, a stop chain 153, a latch, a door stop or a hinge, cooperates with the door 230 to retain the door 230 in the open position. The footrest 258 also may be configured to provide a footrest door (not shown) wherein the footrest door includes a storage area (not shown) to store non-currency gaming items 202 such that when the footrest door moves from a closed position to an open position access is provided thereto.

As further shown in FIG. 10, intersection 260 between straight portion 232 and angled portion 236 may be a smoothly rounded surface for aesthetic appeal and to minimize any unpleasant contact by players. The door 230 may further have different shapes, typically shapes that would allow players to stretch their legs underneath horizontal support member 204 or behind the front edge 208.

In FIGS. 9 and 10, the door 230 also may have at least one lock 262, such as, for example, a manual cylinder lock, electronic lock or bolt lock, attached on the straight portion 232 of the door 230. The door 230 typically is made of galvanized steel, but may be made of other materials, such as, for example, aluminum, non-galvanized steel, wood, combination of polyvinylchloride film on MDF (medium density fiberboard) core, plastic, acrylic, fiberglass and other related materials known in the art.

In order for an individual(s) to store at least one non-currency gaming item 202 including, for example, tickets, vouchers, smart cards, vip cards, player cards and credit cards, in the gaming device base 200 disclosed in FIGS. 8–10, the at least one non-currency gaming item 202 and the gaming device base 200 first are provided. If the door 230 to the gaming device base 200 is in the closed position, the door 230 is moved to the open position to provide access to the storage area 242. The one or more non-currency gaming items 202 then are placed in the storage area 242 and the door 230 is moved to the closed position.

CONCLUSION

Accordingly, the present invention provides a gaming device base including a door having a storage area configured to store non-currency gaming items and a method for storing therein. The door may be moveable from a closed position to an open position, and vice versa. In the open position, access can be provided to the storage area for replenishing and/or for removing the non-currency gaming items. In this way, an individual, such as a casino employee, can replenish the non-currency supply of a gaming device without having to transport the non-currency gaming items on their person.

It can further be seen that with certain embodiments of the present invention, a player who is sitting in front of a gaming device positioned on top of a gaming device base may stretch his or her legs behind an edge of the gaming device base. The player may further rest a foot on a footrest. Therefore, player can sit comfortably in front of the gaming device supported by the gaming device base. The player is therefore more likely to spend more time sitting in front of the gaming device and playing the gaming device. As a result, game operators are likely to gain more revenue with using the gaming device base of the present invention.

Certain embodiments of the present invention further provide a gaming device base having a horizontal support member capable of supporting the weight of a gaming device positioned thereon with minimal tendency of bending or warping.

Although the description above contains many specifications, these should not be construed as limiting the scope of the invention but as merely providing illustrations of various embodiments of this invention. Thus, the scope of the invention should be determined by the issued claims and their legal equivalents rather than solely by the examples given.

We claim:

1. A gaming device base comprising:

(A) a support surface configured to support at least one gaming device; and (B) a plurality of sides configured to support the support surface wherein:

(a) at least one side comprises an upper angled portion and a lower angled portion, each angled portion being an acute angle relative to a vertical plane and intersecting a common plane behind an edge of the support surface;

(b) the upper angled portion comprises an upper door configured to drop down from the upper angled portion when in an open position; and (c) the upper angled portion further comprises an upper compartment configured to store at least one non-currency gaming item and located under the support surface, wherein the upper door may limit access to the upper compartment.

2. The gaming device base of claim 1 wherein the upper door is hingeably attached to the upper angled portion.

3. The gaming device base of claim 1 wherein the lower angled portion comprises a lower compartment configured to store the at least one non-currency gaming item and a lower door wherein the lower door may limit access to the lower compartment.

4. The gaming device base of claim 3 wherein the lower door moves towards the upper angled portion when in an open position.

5. The gaming device base of claim 4 wherein the lower compartment comprises a moveable stand configured to the support the lower door in the open position.

6. The gaming device base of claim 1 wherein a player may place at least an entire foot on the lower angled portion.

7. The gaming device base of claim 1 wherein the non-currency gaming item is selected from the group consisting of tickets, vouchers, smart cards, vip cards, player cards and credit cards.

8. A gaming device base comprising:

(A) a horizontal support member comprising (i) a substantially flat surface configured to support at least one gaming device and (ii) at least one edge;

(B) at least one support structure attached to the horizontal support member, the support structure configured to support the horizontal support member from a floor;

(C) at least a first door being positioned behind the edge of the horizontal support member and underneath the horizontal support member, the first door comprising an angled portion and a first storage area, the first storage area being configured to store at least one non-currency gaming item, the first door further being moveable from a closed position to an open position to provide access to the first storage area, and in the closed position of the first door, the angled portion being an acute angle measured from a vertical plane, wherein players sitting in front of the edge of the horizontal support member may stretch their legs behind the edge; and (D) a footrest attached to the support structure wherein the footrest comprises a second door providing access to a second storage area located beneath the footrest.

9. The gaming device base of claim 8 wherein the non-currency gaming item is selected from the group consisting of tickets, vouchers, smart cards, vip cards, player cards and credit cards.

10. The gaming device base of claim 8 wherein the second storage area is configured to store at least one non-currency gaming item.

11. A gaming device base comprising:

(A) a horizontal support member comprising (i) a substantially flat surface configured to support at least one gaming device and (ii) at least one edge;

(B) at least one support structure attached underneath the horizontal support member, the support structure configured to rest on a floor; and (C) a plate hingeably attached to the support structure, at least a portion of the plate extending under the support member, wherein the plate is configured to allow a player sitting in front of the edge of the horizontal support member to rest a foot on a portion of the plate under the horizontal support member, the plate being moveable from an open position to a closed position and configured to provide access to a storage compartment when in an open position, wherein the storage compartment is configured to store at least one non-currency gaming item; and (D) a stand configured to support the plate in the open position and attached to the storage compartment.

12. The gaming device base of claim 11 wherein the stand is configured to move from a first position to second, substantially vertical, position, and wherein the stand is in the second position when supporting the plate in the open position.

* * * * *

UNITED STATES PATENT AND TRADEMARK OFFICE
CERTIFICATE OF CORRECTION

PATENT NO. : 7,040,626 B2
APPLICATION NO. : 10/944341
DATED : May 9, 2006
INVENTOR(S) : Seelig et al.

It is certified that error appears in the above-identified patent and that said Letters Patent is hereby corrected as shown below:

On the Title Page, item (73) should read

Atlantic City Coin & Slot Company, Inc.
201 West Decatur Avenue
Pleasantville, NJ 08232 and

TC Millwork, Inc.
P.O. Box 826
Bensalem, PA 19020

Signed and Sealed this

First Day of April, 2008

JON W. DUDAS
*Director of the United States Patent and Trademark Office*